US008588311B2

(12) United States Patent
Liron

(10) Patent No.: US 8,588,311 B2
(45) Date of Patent: Nov. 19, 2013

(54) IDENTIFICATION OF VIDEO SIGNALS IN A VIDEO SYSTEM

(75) Inventor: John Edward Liron, Rough and Ready, CA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 463 days.

(21) Appl. No.: 12/448,028

(22) PCT Filed: Dec. 8, 2006

(86) PCT No.: PCT/US2006/046853

§ 371 (c)(1), (2), (4) Date: Jun. 4, 2009

(87) PCT Pub. No.: WO2008/069803

PCT Pub. Date: Jun. 12, 2008

(65) Prior Publication Data

US 2010/0027683 A1 Feb. 4, 2010

(51) Int. Cl.
*H04N 7/12* (2006.01)

(52) U.S. Cl.
USPC .................................. 375/240.26; 375/240.01

(58) Field of Classification Search
USPC ........ 375/240, 240.01, 240.26, 374; 710/317; 327/157
See application file for complete search history.

(56) References Cited

U.S. PATENT DOCUMENTS

| | | | | |
|---|---|---|---|---|
| 4,876,737 | A | 10/1989 | Woodworth et al. | |
| 5,111,160 | A | 5/1992 | Hershberger | |
| 5,381,154 | A | 1/1995 | Guerci | |
| 5,386,240 | A * | 1/1995 | Hori | 348/473 |
| 6,278,864 | B1 * | 8/2001 | Cummins et al. | 455/73 |
| 6,831,491 | B2 * | 12/2004 | Karlquist | 327/156 |
| 6,975,691 | B1 | 12/2005 | Shiraishi | |
| 7,876,871 | B2 * | 1/2011 | Zhang | 375/374 |
| 2002/0138684 | A1 * | 9/2002 | Liron | 710/317 |
| 2003/0128301 | A1 | 7/2003 | Tarr et al. | |
| 2003/0142233 | A1 | 7/2003 | Eckhardt et al. | |
| 2003/0142738 | A1 * | 7/2003 | Ho et al. | 375/229 |
| 2003/0198311 | A1 * | 10/2003 | Song et al. | 375/376 |
| 2008/0129352 | A1 * | 6/2008 | Zhang | 327/157 |

FOREIGN PATENT DOCUMENTS

| | | |
|---|---|---|
| DE | 2914772 | 10/1980 |
| EP | 0251868 | 1/1991 |
| EP | 0465428 | 1/1992 |
| EP | 1396972 | 3/2004 |
| JP | 60154756 | 8/1985 |
| JP | 09200096 | 7/1997 |
| JP | 2000341352 | 12/2000 |
| JP | 2001326616 | 11/2001 |
| KR | 2001009689 | 2/2001 |
| KR | 405911 | 11/2003 |
| WO | WO9917548 | 4/1999 |
| WO | WO9952112 | 10/1999 |
| WO | WO2004064277 | 7/2004 |

OTHER PUBLICATIONS

Gilley, "Digital Phase Modulation: A Review of Basic Concepts," Transcrypt International, Inc., Aug. 7, 2003, pp. 1-29.
International Search Report, Sep. 4, 2007.
International Preliminary Report on Patentability for PCT/US2006/046853 dated Jun. 10, 2009 with attached Written Opinion.

* cited by examiner

*Primary Examiner* — Allen Wong
(74) *Attorney, Agent, or Firm* — Arent Fox LLP

(57) ABSTRACT

Incoming digital video signals to a video system each undergo identification with specific identifier prior to receipt at a corresponding one of the video system inputs. At each of the video system outputs, the output signal undergoes decoding to obtain the identity of the signal to confirm proper routing of signals within the video system.

9 Claims, 3 Drawing Sheets

IDENTIFICATION OF VIDEO SIGNALS IN A VIDEO SYSTEM

This application claims the benefit, under 35 U.S.C. §365 of International Application PCT/US2006/046853, filed Dec. 8, 2006, which was published in accordance with PCT Article 21(2) on Jun. 12, 2008 in English.

TECHNICAL FIELD

The invention relates to a technique for positive identification of digital video signals.

BACKGROUND ART

Identification of a serial digital video signal from a single source or even a few sources generally presents little difficulties. However, in a typical broadcast facility, many serial digital video signals exist, and identification of each signal often proves problematic, particularly as the signals undergo routing through one or more devices, such as a cross-point switcher, some times referred to as a cross-point matrix. Presently, to positively identify a given serial digital video signal during routing, descrambling and de-serialization of the signal must occur in order to decode the identification information. Carrying out these processes requires a significant amount of hardware. Thus, in a system having many serial digital video signals, providing the necessary descrambling and de-serialization hardware often proves impractical from a cost, space and power consumption perspective. For this reason, broadcast facilities typically rely completely on routing control system status information to determine which input connects to a given output in the cross-point matrix. Such reliance incurs the disadvantage that no automated method exists for checking the actual signal present at a given cross-point matrix output and alerting the user should the status information prove erroneous.

BRIEF SUMMARY OF THE INVENTION

In accordance with an illustrative embodiment of the present principles, a method for identifying a digital video signal in a video system commences with the step of phase modulating the digital video signal with an identification signal at an input of the video system, thereby identifying that signal. The phase modulated digital video signal undergoes demodulation at an output of the video system to establish the identity of the video signal. In this way, verification of proper routing of the signal through video system can occur.

DETAILED DESCRIPTION

As described in greater detail hereinafter, in accordance with the present principles, the digital video input signal to a video system, gets identified to enable verification of signals at the system outputs.

Figure 1:
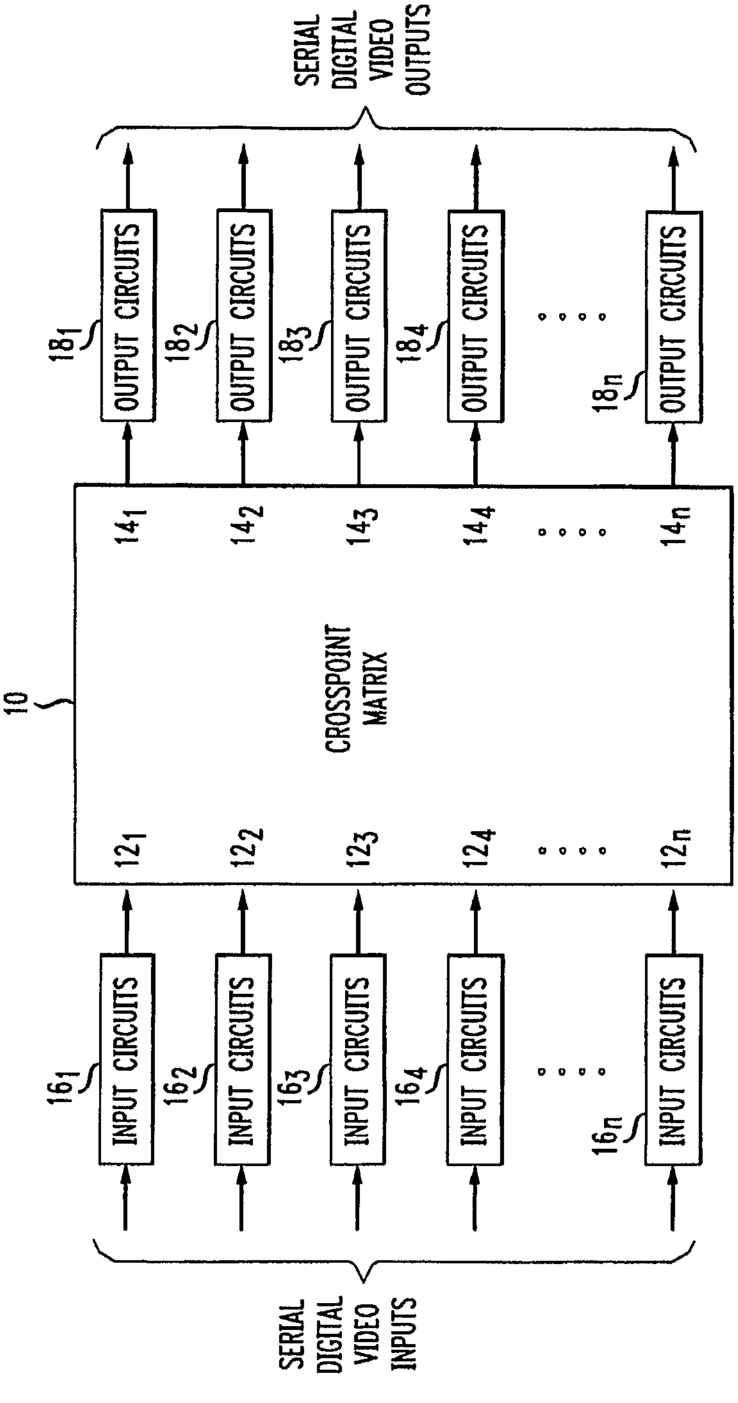
FIG. 1 depicts a block schematic diagram of video system that identifies at least one digital video signals at an input for confirmation at an output in accordance with an illustrative embodiment of the present principles.

FIG. 1 depicts a video system 10 which illustratively takes the form of cross-point matrix, some times referred to as a cross-point switcher or router, having the capability of routing a digital video signal at one or more of its inputs $\mathbf{12}_1$-$\mathbf{12}_n$ to one or more of its outputs $\mathbf{14}_1$-$\mathbf{14}_m$ where n and m are both integers greater than zero, but not necessarily equal to each other. The cross-point matrix 10 performs the routing of selected signals at its respective inputs $\mathbf{12}_1$-$\mathbf{12}_n$ to selected ones of the outputs $\mathbf{14}_1$-$\mathbf{14}_m$ under control of a routing control system (not shown). For a large video cross point matrix where n and m are both large, confirmation of the routing of a digital video signal from an input to any given output previously depended on status information provided by cross-point matrix or its control system. Since no mechanism heretofore existed for independent signal identification, an error in the status information thus could go undetected.

In accordance with the present principles, the cross-point matrix 10 has a plurality of input circuits $\mathbf{16}_1$-$\mathbf{16}_n$ coupled to corresponding ones of the matrix inputs $\mathbf{12}_1$-$\mathbf{12}_n$, respectively. Each input circuit such as input circuit $\mathbf{12}_1$ receives an incoming serial digital video signal destined from the cross-point matrix 10 and provides the signal with its own identification in a manner described hereinafter. In this way, each input signal routed through the cross-point matrix 10 to one or more outputs $\mathbf{14}_1$-$\mathbf{14}_m$ carries its own unique identifier.

Each of the cross-point matrix 10 outputs $\mathbf{14}_1$-$\mathbf{14}_m$ is coupled to a corresponding output circuit $\mathbf{18}_1$-$\mathbf{18}_m$, respectively. Each output circuit, such as output circuit $\mathbf{18}_1$ serves to strip the identifier from the signal at the corresponding cross point matrix output. The identifier stripped from the output signal is decoded to verify that the output signal corresponds to the input signal routed from the intended input. In other words, if the signal at input $\mathbf{12}_1$ was to be routed to output $\mathbf{14}_1$, the identifier associated with the output signal appearing at that output should match the identifier of the input signal at the corresponding cross-point matrix input. Thus, the combination of the input circuits $\mathbf{16}_1$-$\mathbf{16}_n$ and output circuits $\mathbf{18}_1$-$\mathbf{18}_m$ provide a mechanism for determining whether an error exists in the cross-point matrix 10 status information.

Figure 2:
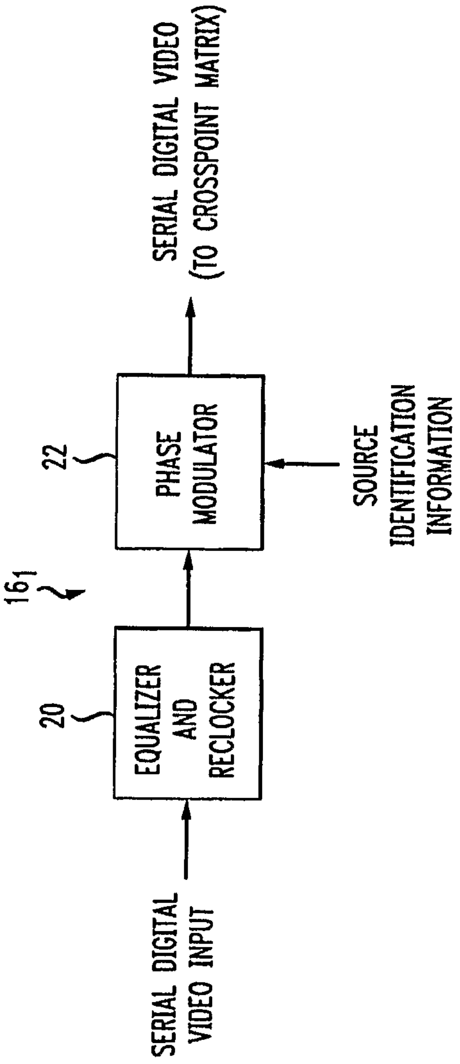
FIG. 2 depicts a block schematic diagram of one of the input circuits of the video system of FIG. 1 to phase modulate an input signal to identify that signal.

FIG. 2 depicts a block diagram of an exemplary input circuit, such as input circuit $\mathbf{16}_1$, all of which share the same features. The input circuit $\mathbf{16}_1$ includes an equalizer and re-clocking circuit 20 for equalizing and re-clocking an incoming serial digital video signal. A phase modulator 22 phase modulates the output signal of the equalizer and re-clocking circuit 20 with a source identification information signal specific to the particular input circuit. In other words, each of the input circuits $\mathbf{16}_1$-$\mathbf{16}_n$ makes use of a different source identification information signal to uniquely identify each incoming serial digital video signal.

The frequency of each source identification signal typically will lie above the pass band of a loop filter (not shown) in the output of the equalizer and re-clocking circuit 20. In practice, the loop band pass bandwidth usually lies in the 100-200 kHz region. The frequency of the source identification signal is also chosen so that it is not an integer sub-multiple of the serial digital video data rate (i.e. 135 MHz, 90 MHz, 67.5 Hz etc. for a 270 Mb/s signal or 742.5 MHz, 495 MHz, 371.25 MHz etc. for a 1.485 Gb/s signal). Avoiding such frequencies avoids the large amounts of energy present at these frequencies in the serial digital video signal frequency spectrum. The depth of modulation is set so that the combined total of phase modulation and jitter from other sources is less than 20% of the unit interval for the data rate used. Setting the depth of modulation in this manner assures that signal recovery can occur without error by during re-clocking by one of the output circuits $\mathbf{18}_1$-$\mathbf{18}_m$.

Figure 3:
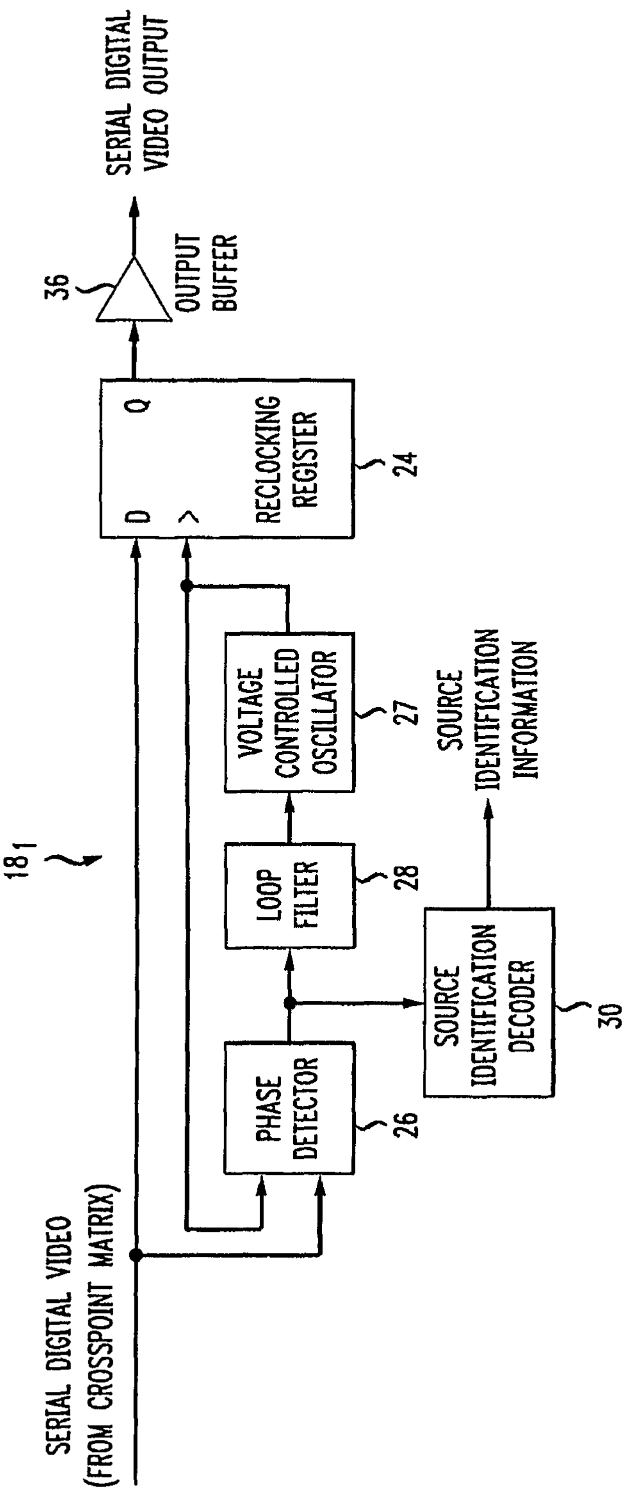
FIG. 3 depicts a block schematic diagram of one of the output circuits of the video system of FIG. 1 to demodulate an output signal for obtain the identification of that signal.

FIG. 3 depicts an exemplary output circuit, such as circuit $\mathbf{18}_1$, all of which share the same features. The output circuit $\mathbf{18}_1$ includes a re-clocking flop-flop register 24 supplied at its D input with the serial digital video signal from the associated output of the cross-point matrix 10 of FIG. 1. A phase detector 26 within the output circuit $\mathbf{18}_1$ also receives the serial digital video signal at a first input from the cross-point matrix 10 of FIG. 1. The phase detector 26 has its second input supplied with the output signal of a voltage controlled oscillator 27 which serves as the clock signal generator for the re-clocking register 24.

The phase detector 26 provides an output signal in accordance with the phase difference between the signals at its first and second inputs to both a loop filter 28 and a source identification decoder 30. The source identification signal decoded by the decoder 30 allows the routing control system for the cross-point matrix 10 (not shown) to verify the correct routing path through the cross-point matrix. The source identification signal has a higher frequency than the pass band of the loop filter 28 so that the loop filter effectively rejects the source identification signal. In this way, the voltage controller oscillator 27, driven at its input by the output signal of the loop filter 28, will not track the source identification signal.

As indicated previously, the output signal of the voltage controlled oscillator 27 serves as the clock signal for the re-clocking register 24. With the loop filter 28 filtering out the source identification signal from the voltage controlled oscillator 27, the source identification effectively gets removed from the output of the re-clocking register 24. In this way, the re-clocking register 24 can drive an output buffer 36 with re-clocked signal corresponding to the incoming serial digital video signal in a normal manner.

The foregoing describes a technique for identifying serial digital video signals in a video system, thereby enabling verification of the routing of such signals through the video system.

The invention claimed is:

1. A method for identifying a digital video signal in a video system, comprising the steps of:

phase modulating an incoming digital video signal with an identification signal at an input of the video system to identify the digital video signal, wherein the video system is a cross-point matrix, wherein the frequency of the identification signal lies above a passband of a loop filter in an output of an equalizer and re-clocking circuit and the frequency of the identification signal is chosen so as not to be an integer sub-multiple of the serial digital video rate, and further wherein the phase modulation is set so that a combined total of the phase modulation and jitter from other sources is less than a predetermined percentage of a unit interval for the serial digital video rate; and demodulating the phase modulated digital video signal at an output of the video system to yield the identity of the digital video signal.

2. The method according to claim 1 wherein the step of phase modulating includes the step of equalizing and re-clocking the incoming digital video signal prior to phase modulation.

3. The method according to claim 1 wherein the identification signal has a frequency that differs from an integer multiple of a data rate of the incoming digital video signal.

4. The method according to claim 1 wherein the demodulating step comprises the steps of:

generating a difference signal in accordance with phase difference between the phase-modulated digital video signal at the video system output and an oscillator output signal;

filtering the difference signal;

varying the oscillator output signal in accordance with the difference signal; and decoding the difference signal to obtain the identity of the digital video signal.

5. A video system having at least one input and output comprising:

at least one input circuit coupled to the at least one video system input for receiving an incoming digital video signal and for processing the video signal to add an identifier thereto, wherein the video system is a cross-point matrix, wherein the frequency of the identification signal lies above a passband of a loop filter in an output of an equalizer and re-clocking circuit and the frequency of the identification signal is chosen so as not to be an integer sub-multiple of the serial digital video rate, and further wherein the phase modulation is set so that a combined total of the phase modulation and jitter from other sources is less than a predetermined percentage of a unit interval for the serial digital video rate; and at least one output circuit coupled to the at least one video system output for decoding a digital video signal at the at least one video system output to obtain the identifier with the incoming digital video input signal.

6. The video system according to claim 5 wherein the at least one input circuit comprises:

an equalizing and re-clocking circuit for equalizing and re-clocking the incoming digital video signal;

a phase modulator for phase modulating the equalized and re-clocked incoming digital video signal with an identification signal specific thereto.

7. The video system according to claim 6 wherein the at least one output circuit comprises:

voltage controlled oscillator;

means for generating a difference signal in accordance with phase difference between the phase-modulated digital video signal at the video system output and an output signal of the voltage controlled oscillator;

means for filtering the difference signal to yield an output signal that drives the voltage controlled oscillator; and means for decoding the difference signal to obtain the identity of the digital video signal.

8. The video system according to claim 6 wherein the identification signal has a frequency above a passband of the loop filter in a re-clocking phase-locked loop.

9. The video system according to claim 6 wherein the identification signal has a frequency that differs from an integer multiple of the data rate of the incoming digital video signal.

* * * * *